United States Patent [19]

Bernaerts

[11] 3,904,313

[45] Sept. 9, 1975

[54] HIGHER HARMONICS HUB VALVE

[76] Inventor: Henry J. Bernaerts, R.F.D. 10, Box 1610, Annapolis, Md. 21401

[22] Filed: Nov. 5, 1973

[21] Appl. No.: 413,110

[52] U.S. Cl. .................................. 416/20; 416/90
[51] Int. Cl.² .................. B64C 11/24; B64C 27/72; B64C 15/00; B64C 27/18
[58] Field of Search .............................. 416/20, 90

[56] References Cited
UNITED STATES PATENTS

| | | | |
|---|---|---|---|
| 1,982,968 | 12/1934 | Stalker | 416/20 |
| 2,686,567 | 8/1954 | Costa | 416/20 |
| 3,031,017 | 4/1962 | Arcidiacono | 416/114 |
| 3,039,537 | 6/1962 | Heidelberg | 416/20 |
| 3,144,908 | 8/1964 | Pascher | 416/114 |
| 3,211,397 | 10/1965 | Laing et al. | 416/20 |
| 3,525,576 | 8/1970 | Dorand | 416/20 |
| 3,525,577 | 8/1970 | Cheeseman | 416/20 |
| 3,713,750 | 1/1973 | Williams | 416/20 |
| 3,816,019 | 6/1974 | Norman et al. | 416/20 |

FOREIGN PATENTS OR APPLICATIONS

| | | | |
|---|---|---|---|
| 907,625 | 3/1954 | Germany | 416/20 |
| 634,332 | 3/1950 | United Kingdom | 416/20 |

*Primary Examiner*—Everette A. Powell, Jr.
*Attorney, Agent, or Firm*—R. S. Sciascia; Q. E. Hodges; O. M. Wildensteiner

[57] ABSTRACT

A hub valve for a circulation control rotor having the inherent capability of producing pulses of air at a given frequency and at harmonics of that frequency. The valve comprises a series of diaphragm or other seals, one for each blade, at the inlet to the air passage in the blade. Each seal is connected by means of a connecting rod to a crankpin on the end of a crankarm. The crankarm is fixed to a support and control shaft in the middle of the hub. The rotational speed of the hub determines the primary frequency of the airflow pulses; the connecting rod and crankarm mechanism superimpose harmonics onto this primary frequency.

2 Claims, 2 Drawing Figures

HIGHER HARMONICS HUB VALVE

The invention described herein may be manufactured and used by or for the Government of the United States of America for governmental purposes without the payment of any royalties thereon or therefor.

BACKGROUND OF THE INVENTION

Helicopter rotors are subjected to complex vibrations arising from the fact that each blade, as it goes through one revolution, passes from a region of high relative speed air flow (the advancing side of the rotor disc) to a region of low or even reverse relative speed air flow (the retreating side of the disc). This causes a vibration in the vertical plane, due to the difference in lift on the two sides of the disc, as well as a vibration in the horizontal plane, due to the difference in drag on the two sides of the disc.

These vibrations set up stresses within the blades and rotor shaft which reduce the operational life of the blades. Merely increasing the size of the blades, to gain added strength, is not effective since the additional weight of the rotor requires additional power to turn it; the larger blades also have greater drag losses which themselves result in the requirement of additional power. All of this serves to decrease the load carrying capacity of the helicopter.

Conventional helicopter rotor designs attempt to alleviate these stresses by allowing the rotor blades to pivot in the directions of the applied stresses. Each blade is hinged so that its angular position with respect to the rotor shaft, when viewed from the top, can change in response to the varying drag it experiences. Each blade can also pivot in the vertical direction in response to the varying lift it produces; the blades are also made thin enough to flex vertically for the same purpose. Finally, each blade is made to change its angle of attack throughout each revolution in order to equalize its lift on both sides of the disc. All of these pivots and flaps introduce complexity, weight, and reliability problems into the rotor.

The circulation control rotor (CCR) helicopter, which utilizes blades which are rigidly fixed to the rotor hub and whose lift is controlled by varying the circulation of air around the blade (see U.S. Pat. No. 3,713,750), solves the primary problem of equalizing lift over the disc without adding to the complexity or the weight of the rotor. However, if the pulses of air that are fed to the rotor are done so at a single frequency, the vibrations resulting from the varying values of drag of the blades and varying amounts of lift produced remain. What is needed is a rotor system which can generate short pulses of lift equal in magnitude and opposite in phase to the forces due to the above vibrations, thereby cancelling out the vibrations. The CCR helicopter has the potential for achieving this, since short pulses of air can be fed to the blades to produce the desired pulses of lift.

Since all vibrations in the rotor are functions of its rotational speed, what is needed is a hub value that can generate cyclic pulses of air at a given frequency and simultaneously at harmonics of that frequency. The pulses of air at the primary frequency would be used for cyclic lift control as in conventional rotors, and the harmonics would be used to offset the vibrations generated by the rotor.

The prior art shows many examples of CCR helicopters, some of which have the capability of imposing harmonics of the primary frequency on the lift control airflow; however, this is accompanied by an increase in complexity of the valve mechanism. Ideally, the valve should be one wherein the desired harmonics are an inherent result of the design of the valve.

SUMMARY OF THE INVENTION

Briefly, the present invention comprises a series of sealing or throttling members, one for the airflow channel in each blade, attached to a support and control shaft in the middle of the hub by means of a connecting rod and crank arm assembly. The blade-carrying member rotates around the central shaft, opening and closing each airflow channel in series. The rotational speed of the blade-carrying member determines the primary frequency of the airflow pulses; the connecting rod and crank arm assembly inherently produces harmonics of this frequency which are superimposed on the primary frequency.

OBJECTS OF THE INVENTION

Accordingly, it is an object of the present invention to provide a CCR helicopter which aids in eliminating the vibration problem of conventional helicopters.

It is a further object of the present invention to provide a hub valve for a CCR helicopter which inherently produces harmonics of the primary frequency of the airflow.

It is a further object of the present invention to provide a hub valve for a CCR helicopter wherein the harmonics of the primary frequency of the airflow are automatically varied when the operating parameters of the valve are changed.

Other objects and advantages of the present invention will be obvious from the following specification and accompanying drawings.

DESCRIPTION OF THE PREFERRED EMBODIMENT

Figure 1:
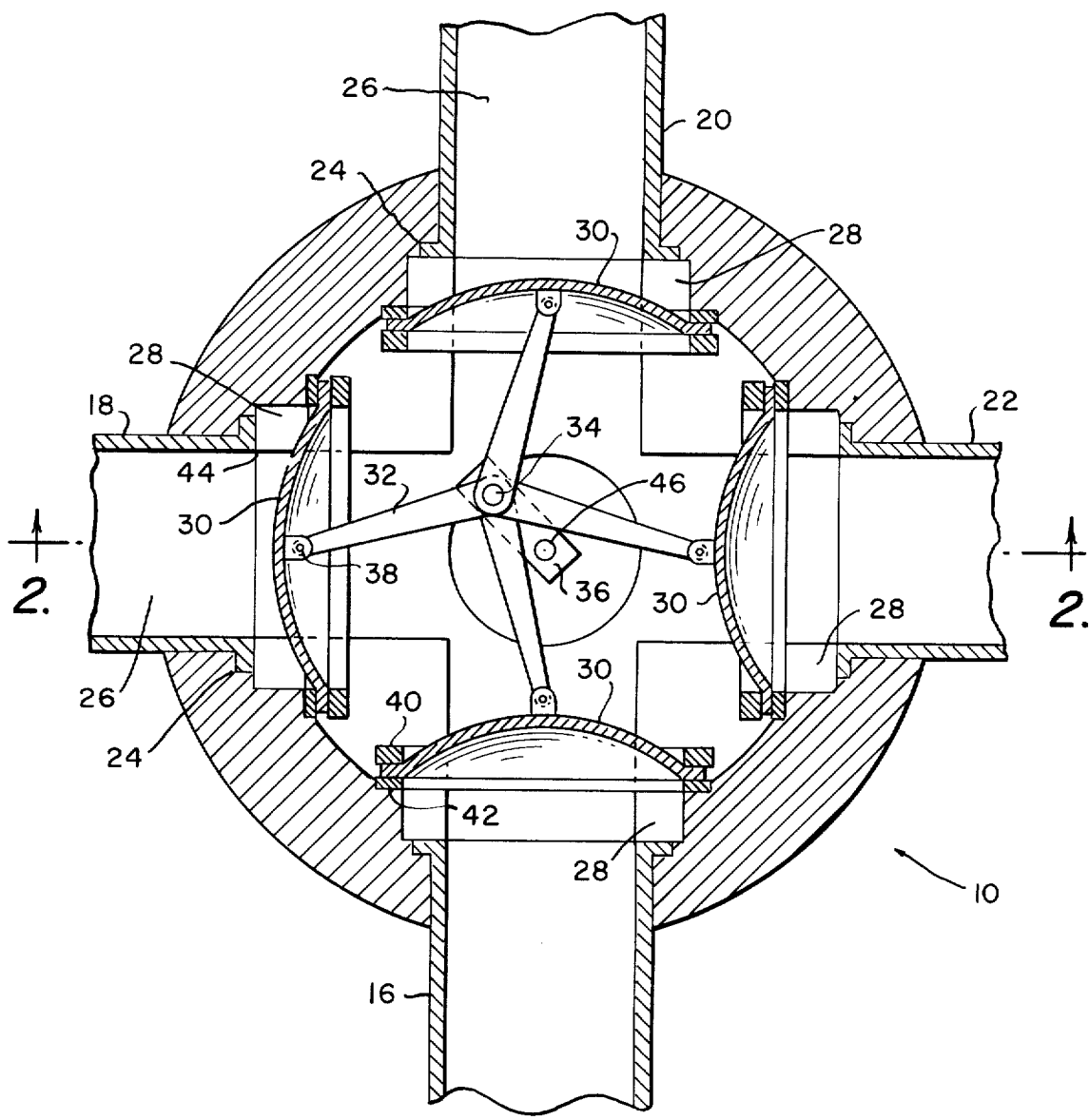
FIG. 1 is a top section view of a hub valve according to the present invention.

FIG. 1 shows a hub valve according to the present invention applied to a helicopter rotor having four blades. It is to be understood however that the hub valve is compatable with a helicopter having any number of blades. Hub assembly 10 is comprised of upper and lower outer members 12 and 14 respectively which carry blades 16, 18, 20, and 22. Blades 16-22 are shown as being retained in hub assembly 10 by means of flanges 24; however, they may be retained by any convenient means as this does not affect the operation of the hub valve of the present invention. Each blade has an air channel 26 within it; at the entrance to each air channel is a recess 28 for diaphragm 30.

The valve of the present invention is comprised of diaphragm 30 and connecting rod 32 which is rotatably journaled on crank pin 34 of crank arm 36. Connecting rod 32 is rotatably connected to diaphragm 30 by means of pin 38 at its center as shown in FIG. 1. Crank arm 36 is rigidly fixed to shaft 46, which is rotatably supported by the stationary structure of the craft; the purpose for making shaft 46 rotatable will be explained later. Shaft 46 in addition can be translated horizontally, as will be explained later.

Figure 2:
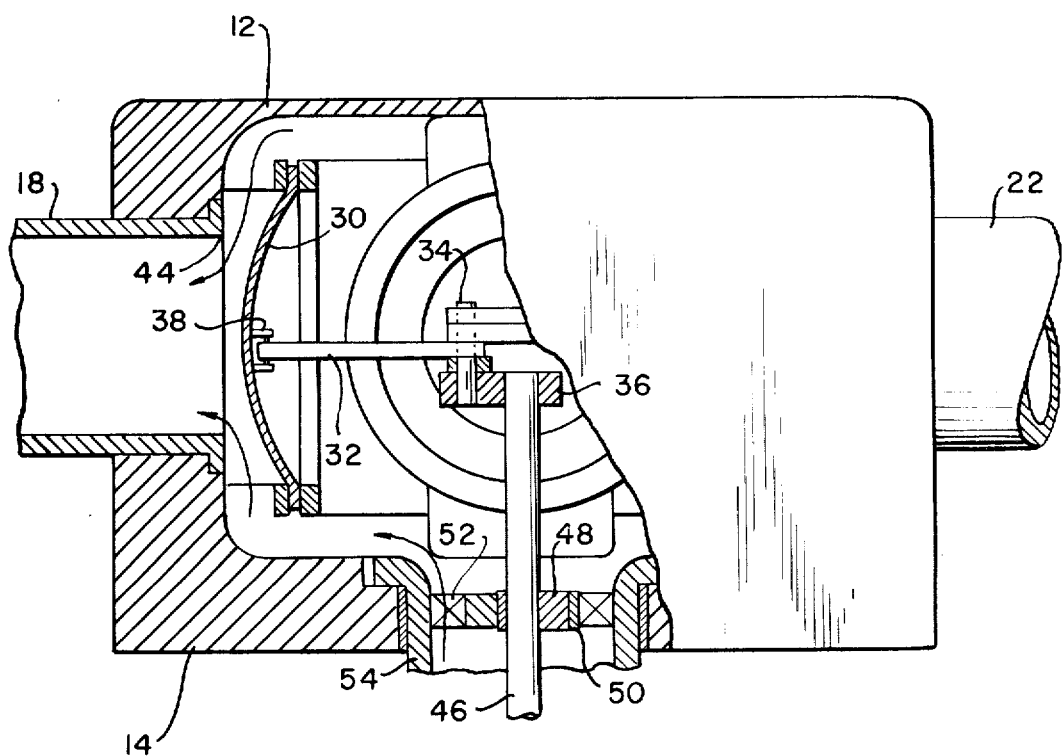
FIG. 2 is taken along line 2-2 of FIG. 1.

Diaphragms 30 are flexible spherical diaphragms as are well known in the art. Each diaphragm 30 is retained within hub assembly 10 by means of circular frames 40 and 42 as shown in FIGS. 1 and 2. Frames 40 and 42 are bolted to hub assembly 10 around the vertical parts of their periphery as shown in FIG. 1. Frames 40 and 42 are unsupported at the horizontal parts of their periphery as shown in FIG. 2; hence these frames should be made sturdy enough to resist deformation as diaphragm 30 is flexed by means of connecting rod 32. When crank arm 36 and connecting rod 32 are in alignment on the centerline of a blade air channel, diaphragm 30 for that air channel will be flexed outward its maximum. At this point the outer surface of the diaphragm should be just contacting the entrance to blade air channel 26 as shown at 44, and all air flow to that particular blade will be stopped. Alternatively, the relationship of the parts may be made such as to leave a certain minimum gap between diaphragm 30 and sealing surface 44 to provide a minimum airflow to the blade at all times.

When crank arm 36 is in the position shown in FIG. 1, there is a gap between diaphragm 30 and sealing surface 44 as shown. Airflow into blade 18 is as shown by the arrows in FIG. 2; no air can flow around the vertical periphery of frames 40 and 42, as these are bolted to outer hub assembly 10 along this vertical periphery.

As shown in FIG. 2, shaft 46 is mounted in eccentric bearings 48 and 50 which are held in place by means of spokes or web 52. Spokes 52 allow air to pass into the center of hub assembly 10 as shown. Eccentric bearings 48 and 50, as is well known in the art, are bearings whose outer races are circular but eccentric with respect to the center line of shaft 46 and whose eccentricities are complimentary. By rotating one bearing with respect to the other, the center line of shaft 46 can be translated to any point within the circular area within outer bearing 50 for a purpose to be explained later.

Connecting rods 32 are shown as being stacked vertically on crank pin 34 of crank arm 36; however, any convenient means of rotatably fastening the connecting rods to the crank arm can be used.

Operation of the valve is as follows: Shaft 54, which supports the hub assembly of the present invention, is caused to rotate by means not shown. Air or other lift control fluid comes up within shaft 54, past spokes 52, and into the hub of the rotor. As the hub rotates around shaft 46, each diaphragm 30 is opened and closed in sequence with other diaphragms. Each diaphragm allows maximum flow once each revolution, and each diaphragm allows minimum or zero flow once each revolution.

The azimuthal position of crank arm 36 determines which diaphragm will be open to its maximum; thus in turn determines the azimuthal position of the pulses of cyclic lift, which controls the direction of flight. Therefore, in order to change the direction of flight, shaft 46 is rotated until crank arm 36 has assumed the desired azimuthal position.

The size of the gap between diaphragm 30 and seating surface 44 determines the amount of air that will flow into each blade. Since all connecting rods 32 are the same length, the variation in airflow between blades is a function of the distance that crank pin 34 is displaced from the center of the hub. Eccentric bearings 48 and 50 are preferably constructed such that their maximum amount of eccentricity equals or exceeds the length of crank arm 36; this allows crank pin 34 to be placed in the center of the hub, by using the eccentricity of the bearings to offset the length of crank arm 36. With crank pin 34 in the center of the hub, equal amounts of air will flow into each blade at all times since each diaphragm 30 will be flexed the same amount as the others at all times.

When it is desired to generate cyclic lift, shaft 46 is rotated to the proper azimuthal position and eccentric bearings 48 and 50 are simultaneously rotated with respect to each other to translate crank pin 34 to the desired point within the hub; in this manner the azimuthal position and amount of cyclic lift are fixed.

As stated earlier, the valve of the present invention inherently produces harmonics of the primary airflow pulse frequency. These harmonics result from the fact that each diaphragm is operated by a crank arm and connecting rod assembly. In this respect the valve is analogous to an internal combustion engine wherein the crankshaft is stationary and the remainder of the engine rotates around it, with the diaphragms 30 corresponding to the pistons in the engine. The vibrations imparted to the crankshaft of an engine are the result of the fact that there is a connecting rod between the pistons and the crankshaft; hence any mechanical assembly that has reciprocating elements connected to a point of rotation by means of a crank arm and a connecting rod will experience the same vibrations and motions. The driving member will have a smooth motion, and the driven member will have the vibratory motion. Thus an analysis which is initially directed to an internal combustion engine is valid for the valve of the present invention. Such an analysis is found in "Engineering Dynamics" Vol. IV, by Giezeno and Grammel (Blackie and Son Ltd, London), pages 5, 6, and 35. The equations of motion for a piston and connecting rod on a crankshaft are:

$$x = r\left[\frac{1}{\lambda} + \cos\psi - \frac{1}{2}\sin^2\psi - \frac{\lambda^3}{8}\sin^4\psi... \right]$$

for the case of the crankshaft on the line of motion of the piston, and:

$$x = r\left[A_0 \cos\psi + A_1 \sin\psi + \frac{1}{4}A_2 \cos 2\psi - \frac{1}{9}A_3 \cos 3\psi... + \right]$$

for the case of the crankshaft offset from the line of motion of the piston. In both equations, $x$ is the distance to the wrist pin (pin 38 in FIG. 1), $r$ is the length of throw of the crankshaft (crank arm 36), $\psi$ is the angle of crankshaft rotation, $\lambda$ is defined as the ratio of connecting arm length to crank arm length, $A_0$, $A_1$, $A_2$. . . are constants.

From inspection of the first equation it will be seen that the terms which include a function of $\sin^2\psi$, $\sin^4\psi$ etc. are the terms which represent the higher harmonics which are superimposed on $x$, the instantaneous position of pin 38. Therefore, since each pin 38 is moved at a fundamental frequency (the rotational speed of the rotor) and at harmonics of that frequency, each diaphragm 30 will also move at the same frequency and harmonics. The airflow past each diaphragm 30 will likewise consist of a fundamental frequency and harmonics.

The effective length of crank arm 36 can be varied by means of eccentric bearings 48 and 50, to vary the maximum deflection of diaphragms 30; this does not disturb the harmonics, however, since they are also a function of crank arm length. Thus the amplitudes of the harmonics of the valve of the present invention are automatically varied when the operating parameters of the valve are varied.

It will be obvious to those skilled in the art that diaphragms 30 can be replaced by other closure elements. For example, a reed valve could be employed; alternatively, some form of plug that fits within the entrance to the blade air channel could also be used.

Obviously many modifications and variations of the present invention are possible in the light of the above teachings. It is therefore to be understood that within the scope of the appended claims the invention can be practiced otherwise than as specifically described.

What is claimed is:

1. A hub assembly for a circulation control rotor comprising:
   a hollow drive shaft;
   a rotating outer hub member surrounding said hollow drive shaft and having a plurality of fluid outlets therein having radial axes, said rotating outer hub member being connected to said hollow drive shaft to form a fluid passage;
   a central shaft;
   individual movable sealing members connected to each of said fluid outlets aligned with said outlets and movable along their axes; and,
   means attached to said central shaft and angularly adjustable about the axis of said central shaft for moving said sealing members sequentially at a plurality of superimposed frequencies during opening.

2. A hub assembly as in claim 1 wherein said means for moving said sealing members comprises a single crank arm on said central shaft and a connecting rod joined to each sealing member and to said crank arm.

* * * * *